United States Patent [19]
Albers et al.

[11] Patent Number: 5,866,496
[45] Date of Patent: *Feb. 2, 1999

[54] CRACKING CATALYST AND PROCESS FOR PREPARING SAME

[75] Inventors: Edwin W. Albers, Severna Park; Harry W. Burkhead, Jr., Arbutus, both of Md.; Joseph C. S. Shi, Bartow, Ga.

[73] Assignee: Thiele Kaolin Company, Sandersville, Ga.

[*] Notice: The term of this patent shall not extend beyond the expiration date of Pat. No. 4,946,814.

[21] Appl. No.: 789,692

[22] Filed: Jan. 27, 1997

Related U.S. Application Data

[63] Continuation of Ser. No. 312,270, Sep. 26, 1994, abandoned, which is a continuation-in-part of Ser. No. 288,504, Aug. 10, 1994, Pat. No. 5,711,930, which is a continuation of Ser. No. 276,318, Jul. 15, 1994, Pat. No. 5,739,072, which is a continuation of Ser. No. 904,336, Jun. 25, 1992, Pat. No. 5,330,943, which is a continuation of Ser. No. 562,905, Aug. 6, 1990, Pat. No. 5,135,756, which is a continuation-in-part of Ser. No. 321,355, Mar. 10, 1989, Pat. No. 4,946,814.

[51] Int. Cl.⁶ .............................. B01J 27/16; B01J 21/16
[52] U.S. Cl. .............................................. 502/68; 502/72
[58] Field of Search ................................. 502/62, 68, 72; 23/293 R

[56] References Cited

U.S. PATENT DOCUMENTS

| | | | |
|---|---|---|---|
| 2,988,520 | 6/1961 | Braithwaite | 423/628 |
| 3,140,249 | 7/1964 | Plank et al. | 208/120 |
| 3,140,253 | 7/1964 | Plank et al. | 208/120 |
| 3,210,267 | 10/1965 | Plank et al. | 208/120 |
| 3,219,590 | 11/1965 | Ribaud | 252/430 |
| 3,271,418 | 9/1966 | Plank et al. | 208/120 |
| 3,425,956 | 2/1969 | Baker et al. | 502/64 |
| 3,436,357 | 4/1969 | Plank et al. | 502/62 |
| 3,459,680 | 8/1969 | Plank et al. | 502/65 |
| 3,565,788 | 2/1971 | Foucher, Jr. et al. | 208/111 |
| 3,640,905 | 2/1972 | Wilson, Jr. | 252/455 |
| 3,657,151 | 4/1972 | Noble | 502/62 |
| 3,844,973 | 10/1974 | Stine et al. | 208/120 |
| 3,867,308 | 2/1975 | Elliott | 502/65 |

(List continued on next page.)

FOREIGN PATENT DOCUMENTS

| | | | |
|---|---|---|---|
| 514 148 | 1/1981 | Australia . | |
| 0291201 | 11/1988 | European Pat. Off. . | |
| 1487811 | 7/1967 | France . | |
| 7509868 | 3/1975 | France . | |
| 0208463 | 5/1984 | Germany | 423/700 |
| 251508 | 7/1986 | Germany . | |
| 46-7570 | 2/1971 | Japan . | |
| 53-48993 | 5/1978 | Japan . | |
| 57-34016 | 2/1982 | Japan . | |
| 57-61615 | 4/1982 | Japan . | |
| 7073097 | 5/1982 | Japan | 423/700 |
| 62-153116 | 7/1987 | Japan . | |
| 3008213 | 1/1988 | Japan | 423/700 |
| 4-16572 | 1/1992 | Japan . | |
| 1497932 | 1/1978 | United Kingdom . | |
| WO89001362 | 2/1989 | WIPO . | |

OTHER PUBLICATIONS

Tada, et al., "New Catalyst Chemistry," pp. 40–41, First Edition, 1988, Sankyo Publication Co., Ltd.
New Surfactants, pp. 622–627.
Hawley's Condensed Chemical Dictionary (New York: Van Nostrand Reinhold Company, 1989), 1111–12.
CRC Handbook of Chemistry and Physics, 62nd ed. (Boca Raton: CRC Press Inc., 1982), F–35, F–38 & F–39.
Iler, *The Colloidal Chemistry of Silica and Silicates*, Cornell Univ. Press, Ithaca, NY (1955).

*Primary Examiner*—Wayne Langel
*Attorney, Agent, or Firm*—Cammarata & Grandinetti

[57] ABSTRACT

The invention is a catalyst and a process for manufacturing a catalyst. The process includes adding an effective amount of an acid stable surfactant or an alkaline stable surfactant to a slurry of particles including an active mineral component. Desirable active mineral components include natural or synthetic zeolites and specialty clays such as chlorite clays and other non-kaolin clays for use in catalysts.

4 Claims, 2 Drawing Sheets

U.S. PATENT DOCUMENTS

| | | | |
|---|---|---|---|
| 3,897,367 | 7/1975 | Lauder | 252/462 |
| 3,957,689 | 5/1976 | Ostermaier et al. | 502/65 |
| 3,985,846 | 10/1976 | Lundsager et al. | 264/44 |
| 4,010,116 | 3/1977 | Secor et al. | |
| 4,019,978 | 4/1977 | Miller et al. | 423/628 |
| 4,066,740 | 1/1978 | Erickson | 423/628 |
| 4,072,600 | 2/1978 | Schwartz | 208/120 |
| 4,154,812 | 5/1979 | Sanchez et al. | 423/628 |
| 4,459,367 | 7/1984 | O'Hara | 502/62 |
| 4,485,005 | 11/1984 | O'Hara | 208/120 |
| 4,521,298 | 6/1985 | Rosinski et al. | 208/111 |
| 4,780,481 | 10/1988 | Courty et al. | 518/713 |
| 4,789,538 | 12/1988 | Cirjak et al. | 423/362 |
| 4,857,498 | 8/1989 | Dejaifve et al. | 502/304 |
| 4,946,814 | 8/1990 | Shi et al. | 502/62 |
| 5,135,756 | 8/1992 | Shi et al. | 502/62 |
| 5,242,881 | 9/1993 | Tang et al. | 502/244 |
| 5,254,516 | 10/1993 | Gupta et al. | 502/84 |
| 5,330,943 | 7/1994 | Shi et al. | 502/62 |
| 5,380,692 | 1/1995 | Nakatsuji et al. | 502/303 |
| 5,411,927 | 5/1995 | Choudhary et al. | 502/302 |

CRACKING CATALYST AND PROCESS FOR PREPARING SAME

This is a continuation of application Ser. No. 08/312,270 filed Sep. 26, 1994, abandoned, which is a continuation-in-part of copending U.S. patent application Ser. No. 288,504, filed Aug. 10, 1994, U.S. Pat. No. 5,711,930, which is a continuation of U.S. patent application Ser. No. 276,318, filed Jul. 15, 1994, U.S. Pat. No. 5,739,072, which is a continuation of U.S. patent application Ser. No. 904,336, filed Jun. 25, 1992, now U.S. Pat. No. 5,330,943, which is a continuation of U.S. patent application Ser. No. 562,905, filed Aug. 6, 1990, now U.S. Pat. No. 5,135,756, which is a continuation-in-part of U.S. patent application Ser. No. 321,355, filed Mar. 10, 1989, now U.S. Pat. No. 4,946,814.

BACKGROUND OF THE INVENTION

1. Field of the Invention

This invention relates to a cracking catalyst and process for preparing the cracking catalyst. Particularly, this invention relates to a fluid cracking catalyst ("FCC") and a process for preparing the catalyst by adding an acid or an alkaline stable surfactant to a component stream prior to forming the dry catalyst.

2. Description of the Background Art

Catalyst manufacturers are continuously seeking catalysts, additives, and processes to improve the properties of their catalysts and to lower the cost of producing the catalysts. Catalyst producers, typically, search for processes to lower the cost of raw materials or utilities, to build higher efficiency equipment or equipment with higher through-put and lower maintenance, or to provide better utilization of zeolite, binder, clay, or added alumina. All of these factors contribute to the direct manufacturing costs of catalysts.

The "CSS process" for producing fluid cracking catalysts involves a continuous mode of preparation of a "clay-silicate-slurry" using concentrated sodium silicate, high solids kaolin slurry, and process water to achieve the proper concentration of silicate expressed as the percent of $SiO_2$. The resulting clay-silicate-slurry is continuously metered against a stream of acidified alum such as 12.5 percent $H_2SO_4$ and 3.0 percent $Al_2O_3$. Typically, both streams are fed simultaneously into a suction-side of a centrifugal pump or a high shear, low volume mixer to produce a usable binder. The discharge from the mixing device is then metered continuously against metered streams of zeolite and, in some instances, a stream of alumina depending on the functionality desired for the finished catalyst.

The industry's attempts to produce catalysts by CSS processes have generally resulted in a catalyst material with poor attrition resistance and low bulk density. These two undesirable attributes result in production cost savings, but provide catalysts that are commercially non-competitive.

U.S. Pat. No. 3,140,249; 3,140,253; 3,210,267; 3,271,418; 3,436,357; and 3,459,680 to Plank and Rosinski disclose molecular sieve-type cracking catalysts. The worldwide petroleum refining industry rapidly adopted the use of these catalysts in the early 1960's because these catalysts provided significant increases in gasoline yields and improved the coke selectivity obtained with zeolite-containing catalysts when compared to catalysts that are based upon amorphous silica-alumina.

The first molecular sieve-type cracking catalysts incorporated rare earth-stabilized faujasite with silica-alumina in ratios between 2.5 and 3.0. These early formulations were simple admixtures of zeolite-molecular sieves with the amorphous silica-alumina and clay-synthetic gel materials that were previously used alone as cracking catalysts. The molecular sieve component of these catalysts was, typically, added prior to spray drying of the gel slurry. The rapid initial success of these catalysts, because of their increased yield and operational benefits, resulted in the petroleum refining industry demanding fluid cracking catalysts that contain molecular sieves. It became apparent, however, that additional benefits in yields and catalyst performance could be achieved by increasing the silica alumina ratio of the zeolite to a value approaching 5. This ratio imparts superior thermal and hydrothermal stability to a catalyst. The demand was further stimulated by the high temperature regeneration technology introduced in the mid-seventies such as that disclosed in U.S. Pat. No. 3,844,973, and the almost simultaneous development of combustion promoter additives for regeneration of fluid cracking catalysts such as those described in U.S. Pat. No. 4,072,600.

Acceptance of these technologies by the refining industry demanded catalysts with molecular sieves of a higher silica-alumina ratio. The higher ratio resulted in improved cracking activity and "stability." This demand was due to the more severe operating conditions to which the catalyst was subjected.

Current processes for removing lead from gasoline have further sustained the world-wide demand for high silica-alumina ratio sieves. This demand is due to the improvement in gasoline octane which can be obtained catalytically by converting high silica-alumina ratio molecular sieves into a modified form known as ultrastable-Y or USY materials. The ultrastable form of Y-zeolite can be achieved by conversion of the sodium form of Y-zeolite (faujasite) before its incorporation into a catalyst. The entire catalyst particle can, alternatively, be treated under conditions which result in an in situ conversion of faujasite within the microsphere itself. The higher the silica-alumina ratio of the starting NaY zeolite, the higher the quality and performance of the resulting ultrastable-Y materials that are prepared either ex-situ or in situ. The phenomenon is, also, noted in the molecular sieves sold under the trade name LZ 210 by the Union Carbide Corporation.

There are a number of patents describing processes for preparing molecular sieve-type catalysts including U.S. Pat. No. 3,425,956. U.S. Pat. No. 3,867,308 discloses the use of a silica-sol type binding system in the preparation of zeolite promoted catalysts. U.S. Pat. No. 3,957,689 discloses alum buffered silica-sol. These catalysts, that are based on "sol technology" for the binding system, were developed in response to an increased demand for harder and higher density catalysts to meet the ever tightening environmental constraints being placed on the petroleum refining industry. These patents are typical of the large body of art in this area.

The introduction of sol bound catalysts provided catalysts having significant improvements in density and hardness. However, examination of these catalysts by Scanning Electron Microscopy ("SEM") revealed that almost every microspheroidal fluid cracking catalyst particle possessed a "blow-hole" or a cavernous region which caused the particle to be more likely to break into two or more smaller fragments during the FCC operation. When catalyst particles break during the FCC operation, the smaller particle fragments are almost instantly lost through a regenerator flue gas stack. If the particle breakage occurs on the reactor side of the equipment, the slurry oil stream becomes over-loaded with catalyst dust referred to as "fines." This condition can result in the total suspension of the operation of the FCC unit. Such a shutdown of FCC operation is extremely costly to a refinery due to both lost product and unscheduled maintenance expenses. The occurrence of "blow-holes" in catalyst particles can be reduced by changes in the catalyst manufacturing process. These process changes are not necessarily easy or economical and do not eliminated the occurrence of "blow-holes."

U.S. Pat. Nos. 4,946,814 and 5,135,756 to Shi et al. disclose a process for improving the physical and catalytic properties of a fluid cracking catalyst. These patents are primarily directed to preparing fluid cracking catalysts. However, the extension of the use of the disclosed processes of these patents to forming other catalyst materials is disclosed. For example, it is explained that the basic process can also be applied to fluid cracking catalyst additives. The present application continues in part from the disclosures of these patents. The disclosures of these two patents are hereby incorporated by reference.

The industry lacks efficient and economical cracking catalysts, additives, and processes to produce catalysts having microspheroidal particles without a significant presence of "blow-holes" or cavernous openings.

SUMMARY OF THE INVENTION

The invention is a fluid cracking catalyst and a process for manufacturing the cracking catalyst. The process includes adding an effective amount of an acid stable surfactant or an alkaline stable surfactant to a component used in the production of a catalyst having an active mineral component. Desirable active mineral components include natural zeolites and specialty clays. The process can then include forming granular or fluid bed catalyst particles and drying the catalyst particles.

DETAILED DESCRIPTION OF THE INVENTION

Figure 1A:
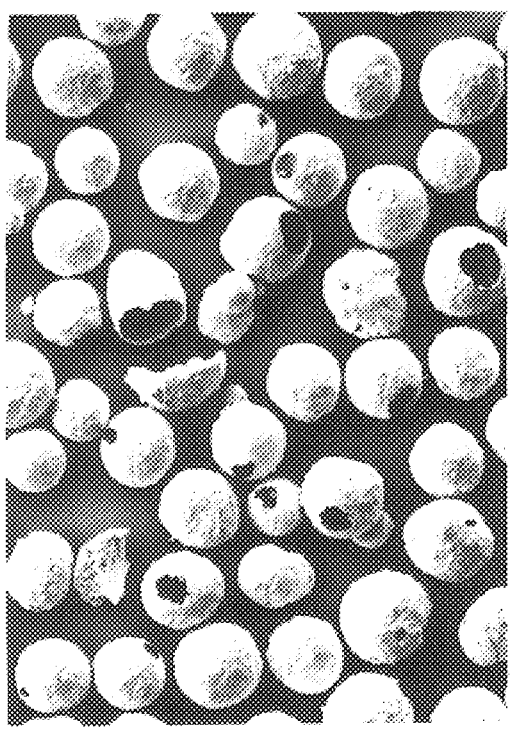
FIGS. 1A and 1B are photo-lithographs illustrating typical catalyst particle morphology provided by a silica-alumina sol-type binder system.

The invention is a cracking catalyst and the process for manufacturing a cracking catalyst. The process includes adding an effective amount of an acid stable surfactant or an alkaline stable surfactant to a component used in the production of a catalyst having an active mineral component. Desirable active mineral components include natural zeolites and specialty clays. The process can then include forming granular or fluid bed catalyst particles and drying the catalyst particles. Non-catalyst and separation-type materials can be made according to this invention.

The dried particles are calcined and can provide catalyst, non-catalyst, or separation-type materials. The materials are often used in fluid or moving beds, ebullient beds, and sieves and to a limited extent in green bodies. The term "particle" as used in this specification usually refers to a microspheroidal particle, but can include certain agglomerates that benefit from being formed by the invention such as granules and beads.

Desirable embodiments of the invention are provided by using a silica-sol binder system buffered with acidified alum as described in U.S. Pat. No. 3,957,689, hereby incorporated by reference. The process of the invention provides fluid cracking catalysts with significantly improved morphology, selectivity, and attrition resistance when compared to catalysts prepared by the same process, but without the surfactant.

Typical preparations of silica sol binder for use with certain embodiments of the invention use a silica hydrosol. The silica hydrosol contains, nominally, about 12 percent solids consisting of about 10 percent silica, and about 2 percent alumina from an acidified alum that buffers the sol. The preferred surface active agents or surfactants for most applications are effective in very low concentrations of about 50 to about 1000 parts per million or about 0.005 to about 0.1 percent. This concentration of surfactant is cost-effective for fluid cracking catalyst manufacturing processes.

Numerous surfactants can be used with this invention. A surfactant is initially selected for its stability in the component to which it is added. For example, the surfactant can be added to numerous "streams" that are used in the process of this invention. A stream is often a slurry of a component used to form the desired particle. A stream can be a dry component. If a stream, within which a surfactant is to be added, is acidic or alkaline, a surfactant must be chosen that is stable in the pH of the selected stream. Information regarding the pH stability of a surfactant is usually provided by the manufacturer of the surfactant. A surfactant that is stable in acid is known as an "acid stable surfactant" and a surfactant that is stable in alkali is known as an "alkaline stable surfactant."

Both natural and synthetic surfactants can be used with this invention. Suitable surfactants or surface-active agents are often detergents, such as linear alkyl sulfonates, and are classified as anionic, cationic, or nonionic. Desirable surfactants for use in this invention are, typically, anionic surfactants. Nonionic block copolymer and anionic fluorohydrocarbon surfactants are the most desirable surfactants for use with the invention. Combinations of surfactants can be used.

The chemical structure for desirable acid stable surfactants is represented as R—$CH_2CH_2$—$SO_3(X)$ where R=F$(CF_2—CF_2)_{3-8}$ and X can be either H or $NH_4$. The acid stable surfactant can be added to most component streams before final slurrying and drying of the material. The addition to a single component of the formulation, however, at a nominal loading of about one pound per 2.5 tons (0.45 kilograms per 907 kilograms) of finished material gives improved attrition resistance and selectivity compared to the same catalyst material prepared by the prior art processes. The use of an acid stable surfactant or an alkaline stable surfactant according to the invention almost completely eliminates the occurrence of "blow-holes" in the particles formed by the invention. This improvement is apparent from the photo-lithographs FIGS. 1A through 4B. Microtome analysis of the material particles made according to the invention demonstrates improved dispersion of individual component particles comprising the microspheres themselves. The invention provides formed particles that have superior density and hardness characteristics.

Acid stable surfactants can often be separately added into any one of the component streams of a manufacturing process, but the greatest improvement in properties of the material is achieved when the surfactant is added to all component streams prior to drying. In this situation, alkaline stable surfactants are usually added to clay or sodium silicate slurries when, for example, a sol binder is formed.

The preferred alkaline stable surfactants are effective in very low, cost-effective concentrations of about 50 to about 1000 parts per million or about 0.005 to about 0.1 percent. The preferred alkaline stable surfactants also have a chemical structure of R—$CH_2CH_2$—$SO_3$ (x) where R=F ($CF_2$—$CF_2$)$_{3-8}$ and X can be either H or $NH_4$. The surfactant can be added to most component streams before final slurrying and drying of a material. The addition to a single component of the material formulation, however, at a nominal loading of about one pound per 2.5 tons of finished material provides improved attrition resistance and selectivity when compared to the same material prepared by the prior art processes.

The inventors have also discovered that streams of different component materials used in the manufacturing process and having at least two different surfactants can be mixed together to provide a material with desirable characteristics. Often, when two or more surfactants are used, one or more surfactants are acid stable surfactants and one or more surfactants are alkaline stable surfactants. These surfactants are selected based upon their stability in a specific stream of the manufacturing process. The following example of a mixture of an acid stable surfactant and an alkaline stable surfactant used in a single manufacturing process, having both an acidic component stream and an alkaline component stream, is provided for illustrative purposes.

A first anionic fluorohydrocarbon surfactant, that is stable in a relatively strong acidic environment of a pH of about 3.0, is selected. The preferred acid stable surfactant is sold by DuPont under the trade name Zonyl TBS. The first anionic fluorohydrocarbon surfactant is added to at least one acidic stream of the manufacturing process in a sufficient concentration to prevent flocculation of the stream. The use of the first anionic fluorohydrocarbon surfactant provides further improvement, in attrition resistance of the final material. A preferred process also adds the acid stable surfactant to a spray dryer feed slurry after all components have been thoroughly mixed.

A second anionic fluorohydrocarbon surfactant, that is stable in a strongly alkaline environment, is selected. The commercial surfactant sold by DuPont under the trade name Zonyl FSA is the preferred alkaline stable surfactant for use with this invention. The second anionic fluorohydrocarbon surfactant is added to at least one alkaline stream of the manufacturing process in a sufficient concentration, for example, to prevent flocculation of the clays or agglomeration of the stream particles.

The current invention includes processes using combinations of acid stable surfactants wherein one surfactant functions as a specific ionic entity and the other surfactant functions as a nonionic block copolymer. Ionic surfactants and, in particular, the fluorohydrocarbon surfactants are relatively expensive when compared to other surfactants. The combination of these surfactants allows for a reduction in the amount of the fluorohydrocarbon surfactant used in the process and provides equally effective results for improving the attrition resistance of materials prepared with only fluorohydrocarbon surfactants.

The addition of acid stable surfactants and in particular anionic fluorohydrocarbon surfactants to the process slurry significantly improves the physical and catalytic properties of materials employing a sol binder. The resulting materials have dramatically improved particle morphology with virtually no "blow-holes." The absence of "blow-holes" in the particles improves the particle hardness-attrition resistance. Moreover, the improved distribution of the various component materials such as molecular sieves, clay, and alumina that comprise the microspheroidal particles results in improved activity and selectivity for the material when compared with an identical formulation made under identical conditions, but without the addition or incorporation of any surfactants.

Anionic surfactants are the most effective surfactants in acid-sol systems, but combinations of anionic and cationic surfactants for specific components can also be effective. A specific embodiment is the combination of anionic fluorohydrocarbon surfactant in combination with an acid stable nonionic block copolymer. Typically, the use has been normalized against the clay level at approximately one pound per ton of clay. Higher loading can be used to maximize the functional characteristics and selectivity properties in a material manufacturing system.

Surfactant concentrations for use with this invention can vary significantly. Any concentration of surfactant, that is sufficient to improve the physical properties of a formed particle material and not adversely affect those physical properties, can be used. The manufacturers of surfactants provide suggested concentrations for processing particular materials with their surfactants. A suitable concentration of surfactant, is desirably, between 0.25 gram per 5 kilograms of dried product and 4 grams per 5 kilograms of dried product. Desirable concentrations of surfactant are provided with 1 to 2 grams of surfactant per 5 kilograms of dried product. The higher concentrations of surfactants do not proportionately improve the characteristics of the resulting product. Desirable concentrations for fluorohydrocarbon surfactants are between about 0.01 to about 0.5 weight percent. The preferred concentration range for fluorohydrocarbon surfactants is between about 0.1 to about 0.2 weight percent.

The exact mechanism by which surfactants function in material manufacturing systems is not clear. It is possible that an anionic surfactant immediately changes the charge on micelles to a strongly negative charge and, thereby, renders the micelles extremely stable against gelling or polymerization. This function has the same effect as raising the pH of a stream to a strongly alkaline pH, wherein the components of the stream are stable. Maximum attrition resistance in the final material occurs, however, when all component streams are treated with a surfactant before being combined into a single slurry and dried. The addition of the surfactant to the spray dryer feed tank, after all components have been added, and then spray drying the mixed components also results in an improved attrition resistance of the particles of the final material.

The catalysts of this invention include an active mineral component. Active mineral components include inorganic compounds having properties that impart and/or enhance a catalyst's activity. For example, desirable active mineral components can increase the selectivity of the catalyst or scavenge contaminants or other materials, such as metals or simple compounds, from the fluid medium passing through the catalyst. Active mineral components for use in this invention, generally, do not improve the physical or structural characteristics of the catalyst particles. Active mineral components, typically, are complex compositions including one or more oxides of aluminum and/or silicon. Desirable active mineral components include synthetic zeolites, natural zeolites, and other specialty clays.

Synthetic zeolites provide desirable active mineral components for use with the catalyst and process of this invention. Desirable synthetic zeolites include a member selected from the group consisting of chabazite, clinoptilolite, erionite, ferrierite, gmelinite, heulandite, mordenite, offretite, phillipsite, sodalite, and mixtures thereof.

Natural zeolites provide desirable active mineral components for use with the catalyst and process of this invention. A zeolite is a natural hydrated silicate of aluminum and either sodium or calcium or both of the type $Na_2O\ Al_2O_3\ xSiO_2 xHOH$. A natural zeolite includes a member selected from the group consisting of analcite, barrerite, chabazite, clinoptilolite, epistilbite, erionite, ferrierite, gmelinite, heulandite, mordenite, natrolite, offretite, phillipsite, sodalite, stilbite, thomosonite, and mixtures thereof. The natural zeolite of the preferred embodiment of this invention is clinoptilolite.

Fluid cracking catalysts, according to this invention, having a natural zeolite are desirable octane additives for use with standard ultrastable Y-type zeolite-containing catalysts. The natural zeolite catalysts of the invention are, desirably, added to a standard catalyst. The use of a natural zeolite catalyst additive, according to this invention, decreases the coke yield from the cracking process and increases the selectivity and yield of the process for desired components. Natural zeolite catalyst additives, made according to the invention, such as those containing clinoptilolite, improve olefin and isobutylene selectivity when compared to the use of the industry standard catalyst additive sold under the trade name ZSM-5. The natural zeolite catalyst additive is usually less expensive than the ZSM-5 additive.

The use of the natural zeolite, clinoptilolite, in particular dramatically decreases the yield of coke and increases the yield of isobutylene. The increased yield of isobutylene is desirable because it is one of the starting materials for producing methyl tertiary butyl ether ("MTBE"). MTBE and tetraamyl ether are two ethers that meet current requirements of the U.S. government for oxygenates in gasolines. This clinoptilolite-containing octane additive of the invention is equal or superior to the industry standard sold under the trade name ZSM-5. The octane additive of this invention produces less coke and an increased feed stock for oxygenate production when compared to the ZSM-5 product. Additionally, the attrition rate of the particles of this embodiment of the invention is substantially below that of the ZSM-5 product and, therefore, much more cost effective in industrial use.

Specialty clays also provide desirable active mineral components for use with the catalyst and process of this invention. Specialty clays are non-kaolin clays that have a desirable characteristic for use in catalysts. Desirable characteristics can include the property or the enhancement of the property of selectivity, scavenging, hardness, or other property sought by catalyst manufactures and/or catalyst users. Specialty clays are known by those having ordinary skill in the industry and are primarily those clays known as chlorite clays. Chlorite clays contain about 12 to about 37 percent magnesium oxide. Chlorite clays increase the SOX scavenging activity of a catalyst. Other desirable specialty clays for use with this invention includes clays known as smectite minerals. Smectite minerals increase the metal gettering activity of a catalyst. Smectite minerals include a member selected from the group consisting of fuller's earth clays containing smectite, hectorite, montmorillonite, montronite, saponite, and mixtures of these. Other clay minerals, such as attapulgite, palygorskite, and sepiolite, are equally effective at metal sequestering.

Fluid cracking catalysts, according to this invention, which include a specialty clay, are also desirable additives for use with standard ultrastable Y-type zeolite-containing catalysts. The specialty clay catalysts of the invention are added to the standard catalyst at a rate to provide about 5 to about 10 percent of the total catalyst in circulation. The use of a chlorite clay improves gasoline selectivity and imparts a SOX gettering activity to the catalyst. The use of a montmorillonite or fuller's earth-type clay imparts a metals sequestering activity for nickel and vanadium to the catalyst.

The use of many active mineral components, such as natural zeolites and other specialty clays, is made economically efficient by this invention. The use of these active mineral components results in "soft" particles having an undesirable high attrition rate unless the particles are made according to the process of this invention. The use of an acid stable surfactant or an alkaline stable surfactant produces uniform particles having attrition rates below those obtained with particles made by standard processes.

The concentration of an active mineral component in this invention must be a concentration sufficient to impart the desired property of the active mineral component to a catalyst. Desirable concentrations of the active mineral component are about 5 to about 25 percent by weight of the catalysts. The concentration of an active mineral component, typically, is a substitution of all or part of the zeolite concentration in a standard fluid cracking catalyst. For example, a standard fluid cracking catalyst is 25 percent zeolite, 23 percent silica-sol binder, 10 percent alumina with the remainder being a clay which is usually a kaolin clay. Desirable concentrations of active mineral components, according to this invention, replace all or part of the 25 percent zeolite concentration of the standard fluid cracking catalyst. When the catalyst made according to this invention is used as an additive with a standard catalyst, the additive catalyst is added to the standard catalyst to obtain a concentration of about 5 to 10 percent of the total catalyst in the circulating inventory. Concentrations of these natural zeolite additives can be up to about 35 to about 40 percent of zeolite input in the additive. Concentrations can vary according to the selected materials, desired properties, and/or the equipment in use in a process.

Inorganic binders, if used with this invention, are commercially available and are selected for their ability to bind the specific material being processed. Desirable inorganic binders can be silica sols, alumina sols, and mixtures thereof. Other desirable inorganic binders include a member selected from the group consisting of bentonite, calcium sulfate, feldspar, forsterite, kaolinite, oil shale, portland cement, vermiculite, and mixtures of these. Other inorganic binders can be used and can include other clays such as montmorillonite.

Inorganic binders are used in an amount sufficient to bind the catalyst, non-catalytic material, or separation-type material being processed by the invention. Desirable concentrations of inorganic binders are from about 2 to about 15 weight percent.

Organic binders, if used with this invention, are commercially available and are selected for their ability to bind the specific material being processed. Desirable organic binders include a member selected from the group consisting of hydroxypropyl cellulose, hydroxypropyl methyl cellulose, lignin sulfonate, molasses, polyvinyl acetate, starch, and mixtures of these. Other organic binders can be used with this invention.

Organic binders are also used in an amount sufficient to bind the catalyst, non-catalytic material, or separation-type material being processed by the invention. Desirable concentrations of organic binders are from about 0.1 to about 10 percent by weight. The viscosity of the particular grade and type of the selected organic binder can alter the concentration required to bind the material being processed.

Activator, promotor, and/or scavenger compounds are often included in the catalyst and non-catalyst materials made by this invention. Such materials can include alkali oxides, such as nacholite and trona, which scavenge hydrochloric acid. Materials for decomposing ammonia can be included such as combinations of Group VIII metal oxides, such as those derived from cobalt and nickel, with Group VIB metal oxides, such as those derived from molybdenum and tungsten, with or without additional Group VIIB and Group VIII metals, such as rhenium and iridium. Desirable promoters for SOX additives include a member selected from the group consisting of cerium, platinum, vanadium, and mixtures thereof.

The concentrations of the activator, promotor, and/or scavenger compounds used with the invention must be sufficient to provide the desired function. Activator or promotor compounds selected from the group consisting of Groups VIB, VIIB, and VIII metal compounds and Groups IA and IIA alkali and alkaline earth metal compounds can be used in concentrations up to about 10 percent.

The prototectosilicates, utilized as additive promoters with this invention, constitute an unusual class of natural and synthetic materials. They are characterized by having a rigid crystalline framework structure composed generally of an assembly of atoms, other than those of oxygen, each surrounded by a tetrahedron of shared oxygen atoms, and a precisely defined pore structure. Desirable crystalline prototectosilicate additives for use in this invention are described in U.S. Pat. No. 4,521,298 to Rosinski et al., hereby incorporated by reference. Faujasite is used in the preferred embodiment and throughout the examples below. However, numerous zeolites and molecular sieves are suitable for use with this invention. Molecular sieves such as aluminum-phosphorous-oxide ("ALPO") and silica-phosphorous-oxide ("SAPO") sold by Universal Oil Products ("UOP") are also suitable for use with this invention.

Additive promoters suitable for use with this invention include aluminosilicates, gallosilicates, ferrosilicates, borosilicates, chromosilicates, aluminogermanates, phosphosilicates, and galoaluminosilicates. The additive promoter can be an aluminosilicate, but aluminum can be replaced in part or in full by gallium, iron, boron, phosphorus, chromium or mixtures thereof or even eliminated entirely. Silicon can be replaced, in part or entirely by germanium.

A first step of the preferred process of the invention is the preparation of an aluminum sulfate or "alum" silica sol component. In this step of the process, about 0.4 to 0.46 kilograms (kg) of alum is dissolved in 1.7 to 1.8 kilograms of water in a suitable reactor. A quantity of about 0.28 to 0.29 kilograms of concentrated sulfuric acid is added to the solution. The acidified solution is cooled to room temperature and a quantity of sodium silicate, containing about 12.4 weight percent (wt. %) silicon dioxide is added with constant stirring. The silicate addition is adjusted to achieve a pH of between about 2.8 and about 3.05 in the resulting slurry.

A clay slurry is prepared in a second step of the process. A sufficient quantity or selected amount of kaolin clay is added to a quantity of water sufficient to prepare a slurry containing about 70 percent solids. The clay is dispersed by adding a dispersant such as tetrasodium pyrophosphate in an admixture with sodium polyacrylate.

The concentrations for a zeolite slurry and an alumina slurry can vary. A desirable aqueous slurry has about 70 percent solids clay slurry for dilution of the sodium silicate to a concentration of about 12.4 weight percent silicon dioxide, thus forming a clay-silicate slurry. Prior to adding this slurry to the acidified aluminum sulfate or alum, an alkaline or acid stable surfactant is first added to the clay-silicate slurry ("CSS"). The most desirable surfactants for this component are those that are stable in an alkaline environment. Alkaline stable surfactants are commercially available.

The preparation of the clay-silicate slurry is added with constant stirring to the previously prepared alum solution. The clay-silicate slurry addition is adjusted to achieve a pH of about 2.8 to 3.05 in the resulting slurry.

An active mineral component slurry, which can include zeolite, is prepared in a third step of the process. A sufficient quantity of the active mineral component is added to a quantity of water sufficient to prepare a slurry containing about 30 percent solids. The pH of the slurry is adjusted to about 4.5 to 4.8 with a 20 percent solution of sulfuric acid. Any faujasite having a "silica to alumina ratio" of about 5 can be used when this slurry is a zeolite slurry. The faujasite sold under the trade name PQ Valfor CP 300-63 provides satisfactory results.

An alumina slurry is then prepared by adding dry alumina powder to a sufficient quantity of water to prepare a slurry containing about 20 to 25 weight percent solids. The alumina slurry is added to the other ingredients already in the mixing tank to prepare the final spray dryer slurry.

The addition of the surfactant to any one of the components is critical to the invention. The addition is preferably made in the third step of the process described above, but the surfactant can be added to any one or more of the component slurries individually or after all other components have been combined. The surfactant is preferably diluted from a stock solution before it is used and added as about a 1 percent by weight solution.

A final step of the invention is the drying step. The drying step, is preferably, a spray drying step. Spray drying is a well known and a well established drying procedure for drying slurries. This procedure is accomplished by feeding the slurry to a conventional spray dryer. Desirable drying is provided by feeding the slurry to a spray dryer employing a "spinning wheel atomizer" operated at an atomizer wheel speed of 10,000 revolutions per minute ("rpm"). The spray dryer is preferably operated at an inlet temperature of about 500° Fahrenheit ("F") to above 800° F. and an outlet temperature of about 225° F. to about 350° F.

Following spray drying and before any physicochemical tests can be conducted on the resulting catalyst, the sodium associated with a zeolite and the occluded salts resulting from the addition of a binder must be removed. One technique to effect removal of the binder is a "pre-exchange" of the zeolite. Another technique is to use low sodium content binders, such as silica sol, silica-alumina sol, or alumina sol, to avoid washing and/or exchanging with ammonium salts or rare earth salt solutions. However, in the typical commercial operation washing, exchanging, and often intermediate calcination at 1000° F. to 1100° F. are required to adequately reduce the sodium to levels that do not impair the function of a given catalyst formulation.

The addition of a proper surfactant for the clay-silicate slurry, either alone or in combination with other surfactants added to the other components or slurry streams, produces catalysts that are equivalent in physical properties to those prepared by conventional processes. Additionally, the application of a second surfactant added to the zeolite and alumina, the acid-alum, or the spray drier feed tank produces catalysts with superior physical properties. The catalytic response of all these embodiments is equivalent to the industry standards for catalysts. The economical benefits of the invention do not result in a sacrifice of catalyst activity or selectivity.

This same technology when applied to mixtures of clays such as (1) kaolinite and fuller's earth or "montmorillonite", (2) kaolinite and metakaolin, or (3) kaolinite and calcined kaolinite or "mullite or incipient mullite-spinel" produce fluid cracking catalysts with improved attrition values during use. These catalysts have improved cracking ability and are extremely valuable for gas oil feeds which are high in metal contaminants such as nickel and vanadium and high in sulfur contaminants.

This invention can be used with fluid cracking catalyst additives also. For example, the replacement of the faujasite component in a typical fluid cracking catalyst formulation with a pentasil zeolite, such as that sold under the trade name ZSM-5, in a concentration of 15 to 25 percent results in an octane additive with substantially improved attrition resistance. Since these types of additives are much more expensive to produce than a conventional fluid cracking catalyst and, therefore, more costly for a refiner to use, better unit retention provided by the improved attrition resistance enables a refiner to operate with this type of additive with significant improvement in the overall catalyst costs.

Additives having blends of clays with kaolin in the absence of zeolite also perform well as metal "getters" or SOX-type additives. In the past, these same combinations of clays have been tried without success, not because of their lack of functionality as metal "gettering" or SOX reduction, but simply because the attrition resistance of the fluid additive particles was poor.

FIGS. 1 through 4 illustrate scanning electron microscope ("SEM") photo-lithographs at different magnifications for fluid cracking catalysts with and without the acid stable surfactants. Examples with specific fluorohydrocarbon surfactants are included. The particles of these photo-lithographs were formulated with 25 percent sodium zeolite in the Y form, 23 percent silica, 10 percent alumina, and 42 percent clay using a silica sol-type binder system.

Figure 1B:
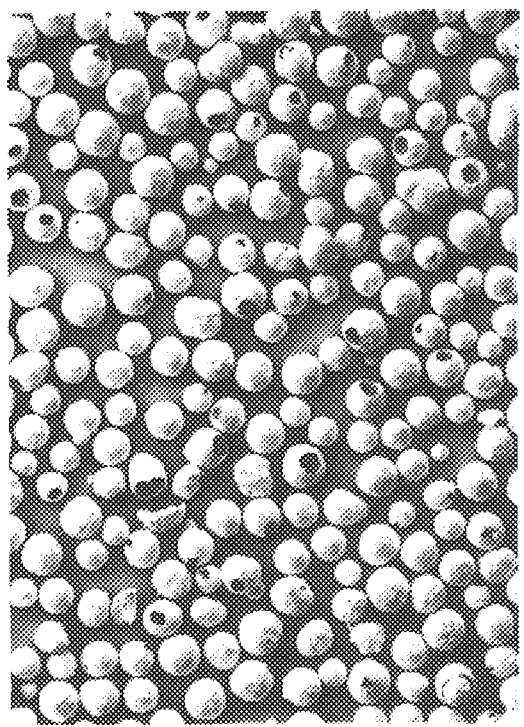

FIGS. 1A and 1B represent a typical morphology for this general type of binder system. The overwhelming majority of particles have "blow holes" and in some instances the thin shell character is easily discernible. This particular sample of particles had a Corrected Attrition Index of 12.13 and a Attrition Rate of 2.3.

Figure 2A:
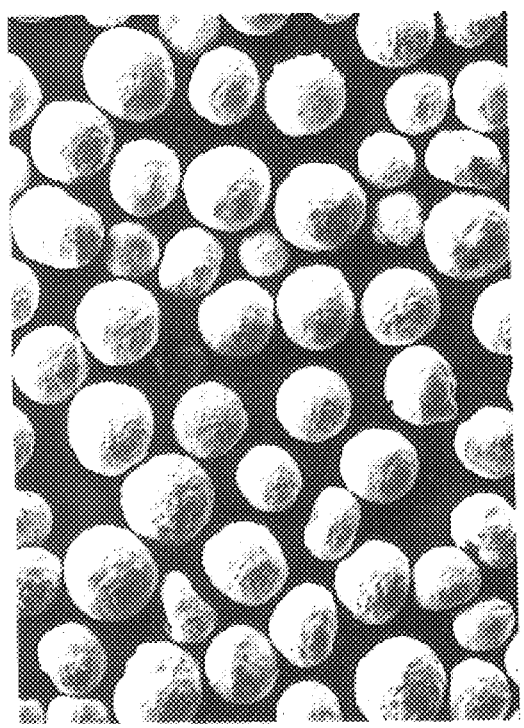
FIGS. 2A and 2B are photo-lithographs illustrating catalyst particle morphology that is produced by the addition of fluorohydrocarbon surfactants to a clay slurry.
Figure 2B:
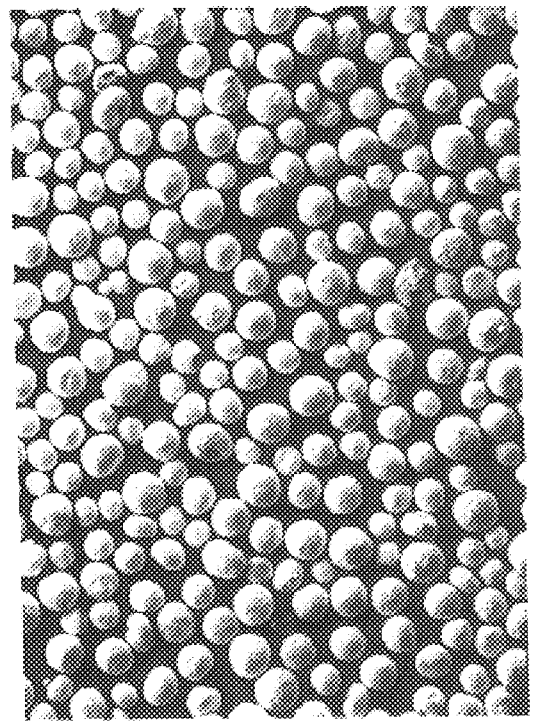

FIGS. 2A and 2B depict the effect on particle morphology when specific acid stable fluorohydrocarbon surfactants are added to the clay slurry. The "loading" for these particles was 1 gram of a fluorohydrocarbon surfactant, sold under the trade name FC-95 by the 3M Company, per 2442 grams of clay. Examination of the photo-lithographs demonstrates the almost complete elimination or absence of "blow-holes" in the particles. Moreover, broken remnants of particles indicate that a more homogeneous solid particle is provided by the invention. The attrition data for this sample had a Corrected Attrition Index of 2.39 and Attrition Rate of 0.48.

Figure 3A:
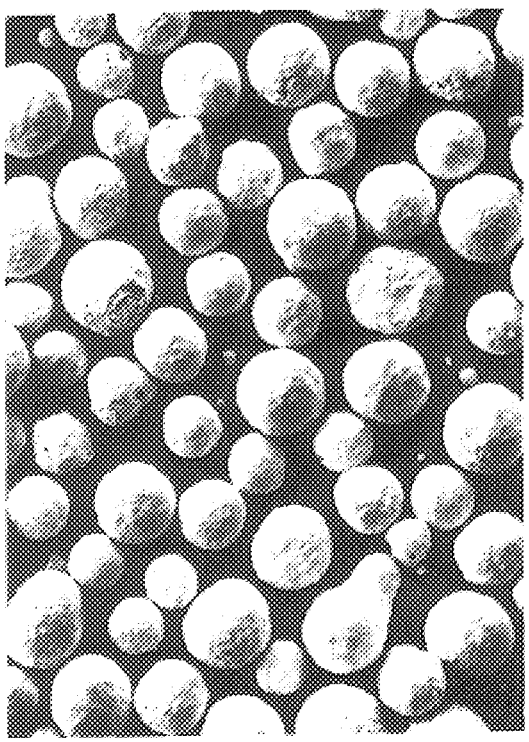
FIGS. 3A and 3B are photo-lithographs of a catalyst product that is produced by the addition of an acid stable surfactant to a clay slurry.
Figure 3B:
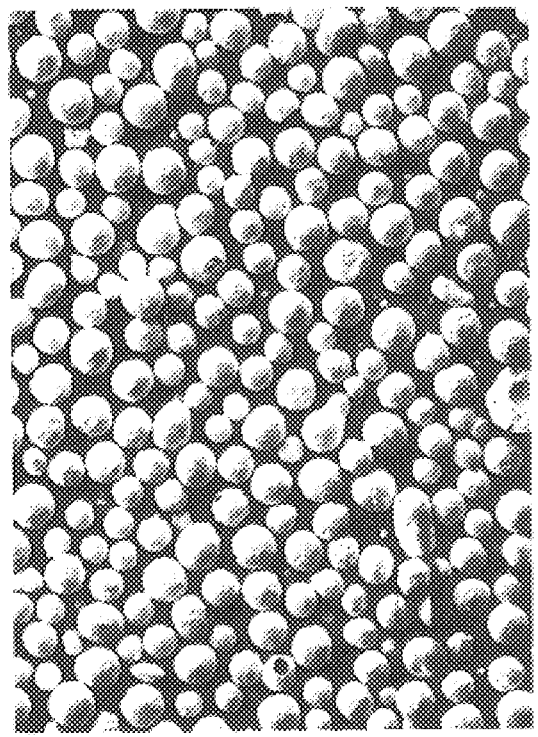

FIGS. 3A and 3B illustrate comparable results that are obtained with the product sold under the trade name Zonyl TBS at an equivalent surfactant loading. The two surfactants provide similar morphological results, but Zonyl TBS product results in a more homogenous particle. This result is evident from the smoother surface and thicker shells for the particles.

Figure 4A:
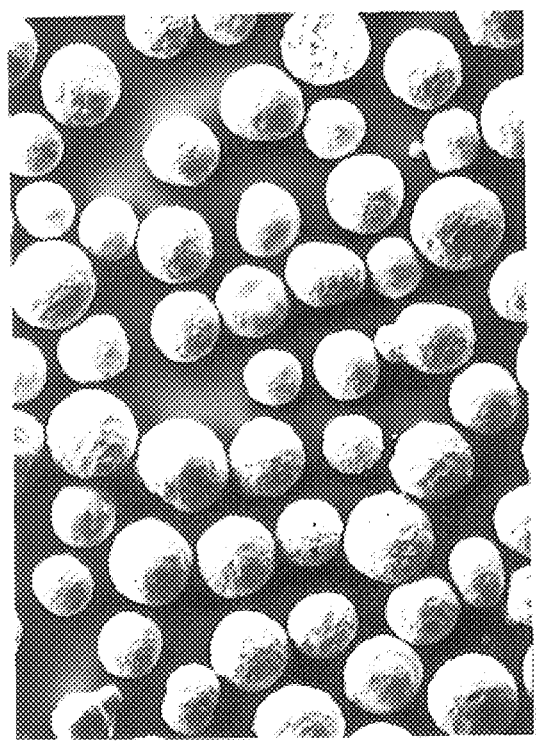
FIGS. 4A and 4B are photo-lithographs of a catalyst product that is produced by the addition of an acid stable surfactant to a clay slurry.
Figure 4B:
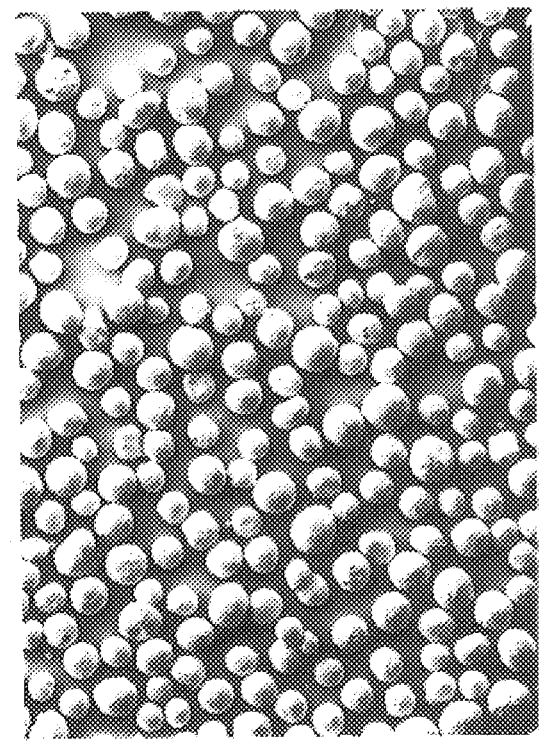

FIGS. 4A and 4B illustrate the results provided when the loading of Zonyl TBS product has been increased to 2 grams per 2442 grams of clay. The photo-lithographs show particles having almost a complete absence "blow-holes" and, correspondingly, no thin shell formation. The attrition data for this sample had a Corrected Attrition Index of 1.32 and Attrition Rate of 0.26.

The invention provides desirable fluid cracking catalysts as well as desirable hydrocracking and hydrotreating catalysts or non-catalytic or separation-type materials. Other notable benefits of the invention include the control of particle size and improved randomization of individual component particles in binding ceramics and superconducting formulations based on a variety of inorganic oxide systems which contain identical or similar oxide components to those used in the production of FCC catalysts and additives. The invention improves any system wherein the electrical charge distribution of individual components, under normal processing, prevents or hinders the integrity and functionality of the final material being processed. The application of the invention changes the charge distribution of the individual component particles, such that the obtained materials, so treated, have improved integrity and functionality.

The active mineral component or the zeolite content of catalyst particles can be increased to a 50 percent level without a major loss in the integrity of the catalyst particle. Catalyst formulations based on 50 percent active mineral component or zeolite input produce catalysts which can operate in a commercial unit. High doses or the correct level and combination of one or more surfactants can achieve attrition resistance values for catalysts that are comparable to the standard catalyst formulations that are currently used by the industry. The examples describe below are operable in a commercial unit.

EXAMPLES

The following Examples represent the process of the invention. Examples 2 through 5 represent the catalysts and processes of the invention that utilize an active mineral component.

The following Comparative Examples and Examples refer to "Run Numbers" when describing actual embodiments of the invention. The use of this term was adopted by the inventors for convenience and is not an indication of an actual number of runs or completed reductions to practice of the invention.

GENERAL PROCEDURE

The following general procedure was used in the Comparative Example and the Examples of the invention.

1. A quantity of the spray dried material of between 260–270 grams was slurried in 800 to 1000 milliliters ("ml.") of water heated to 140° F. to 160° F. (60° C. to 71° C.).

2. The slurry was dewatered in a Buchner funnel.

3. A solution of ammonium sulfate was prepared by dissolving about 140 to 160 grams of ammonium sulfate in 1300 to 1600 grams of water. The filter cake was rinsed with about 1600 grams of this solution that had been heated to 140° F. to 160° F. (60° C. to 71° C.).

4. The filter cake was then rinsed with 100 to 1400 milliliter of water that was heated to between 140° F. and 160° F. (60° C. and 71° C.).

5. The filter cake was reslurried and the pH of the resulting slurry was recorded.

6. A rare earth exchange was completed by adding a solution of rare earth chloride hexahydrate containing 2 grams of the hexahydrate per 100 grams of finished catalyst. The finished catalyst contained 1 percent rare earth oxide. The pH was adjusted to a pH of 4.7 to 5.0 and was maintained at that value for about 10 minutes.

7. The slurry was dewatered in a Buchner funnel and rinsed with about 1200 milliliters of water heated to between 140° F. and 160° F. (60° C. and 71° C.).

8. The filter cake was dried at 450° F. (232° C.) followed by calcination of the dry powder at 1000° F. (538° C.) for one hour.

After drying, the finished catalyst was prepared according to the art for subsequent testing.

9. Steps 1 through 4 were repeated. The product was washed with 1800 milliliters of water heated to between 140° F. and 160° F. (60° C. and 71° C.).

10. The filter cake was dried for 4 hours at a temperature of 450° F. (232° C.) and the catalyst product was recovered.

The process described above is used to prepare a faujasite-containing rare earth catalyst. The novel process can also be used to prepare amorphous gel-based catalysts.

If a catalyst devoid of rare earth is to be prepared the rare earth exchange step is eliminated. The calcination temperature in step 8 can be performed at temperatures between 1000° F. and 1500° F. (538° C. and 816° C.) depending on the type of hydrogen Y catalyst being prepared.

ATTRITION TEST PROCEDURE

The following procedure was used in the Comparative Example and the Examples to evaluate the attrition of a catalyst.

The attrition test is similar to that described in U.S. Pat. No. 4,010,116. The procedure for the measurement is as follows.

1. A sample of catalyst is calcined in a muffle furnace at 1000° F. (538° C.) for 1 hour.

2. A 45.0 gram sample of calcined catalyst is mixed with 5 grams of water in a capped container and shaken to humidify the catalyst. The sample is then allowed to cool for approximately 15 minutes.

3. The humidified catalyst is charged to the attrition tube with a low air flow rate already established or about 1.5 liters/minute.

4. The test air flow rate of 9 liters/minute is established.

5. After 1 hour, the fines collection thimble is quickly replaced by a fresh collection thimble and the weight of collected fines is determined.

6. Step 5 is repeated at hourly intervals for a desired period. The Examples were determined using 3 hours and extrapolating to the normally quoted 5 hour value.

7. The hourly data is either plotted or entered into a computer program to give three attrition parameters discussed below. The results are expressed in terms of the following parameters.

ATTRITION INDEX (AI) at 5 hours—This value is the total amount of fines expressed as a weight percent (wt. %), collected in the fines collection thimble after exactly 5.0 hours. The collection of data at a time not corresponding exactly to hourly intervals was corrected either graphically or by linear regression fitting. This parameter is an indicator of short term catalyst loss in the commercial operation. A hard catalyst is considered to have an AI of 7 or lower. Values of 12 and lower are commercially acceptable.

ATTRITION RATE—This index is the rate of fines generated between 1 and 5 hours expressed as weight percent per hour. This parameter is an indicator of the longer term loss of catalyst in the commercial FCC unit resulting from attrition. Generally, values of 1.0 and less are desired.

INITIAL FINES (Intercept)—This value is the amount of fines generated at time zero in the test. This parameter is an indication of the amount of fines (0 to about 20 microns) present in the original spray dried catalyst. As such, it is an indicator of the amount of fines which will be lost immediately from the commercial unit when fresh catalyst addition is made.

CORRECTED ATTRITION INDEX (CAI)—This index is the Attrition Index minus the Initial Fines. This represents a correction for the amount of 0 to 20 microns material in the original sample as charged to the test.

COMPARATIVE EXAMPLE A

PREPARATION OF CATALYSTS WITHOUT THE ADDITION OF ACID STABLE OR OTHER SURFACTANTS

This comparative example prepared two samples of a "standard" fluid cracking catalyst. Both samples had 25 percent sodium Y zeolite and contained kaolin clay.

PREPARATION OF ACID/ALUM SILICA SOL BINDER

An acid/alum solution was prepared by mixing the following components in the ratios shown to the volume needed. A quantity of 0.454 kilograms ("kg") of aluminum sulfate was thoroughly mixed with 1.79 kg of water. The mixture was agitated until all the aluminum sulfate had been dissolved. After the sulfate had been dissolved, 0.029 kg of 95% to 98% sulfuric acid was added. This solution was then cooled to at least 86° F. (30° C.) before it was used. The acidified alum solution was pumped into a high shear mix pump and simultaneously a stream of sodium silicate, containing 12.4 wt. % silica, was also pumped into the mix pump. The silicate flow rate is adjusted to achieve a pH in the mixing pump discharge in the range of 2.80 to 3.05. A 3:1 flow of silicate to acidified alum was typically required to achieve the desired pH range.

CLAY SLURRY

A slurry of kaolin clay was made up to a 70% solids slurry, measured by O'Haus moisture balance, using the dispersing agents, TSPP and sodium polyacrylate (NaPa), in a slurry make-up water. The proportions used were 0.24% TSPP predissolved in hot water to a 10% solution, and 0.25% NaPa, based on the weight of air float clay. The dispersant is first added to the make-up water followed by the dry clay which is added under high shear agitation.

1. The binder solution was prepared consisting of acid/alum and sodium silicate as described above.

2. The required amount of the binder was transferred to a mix tank under a high shear mixer. The temperature and pH of the mix were recorded.

3. The required amount of clay slurry, prepared as described above, was added to the high shear mix tank. The temperature and pH of the mix was recorded.

4. A zeolite slurry was prepared by slurring dry zeolite powder in water to 30% solids and the pH of the slurry was adjusted to 4.5 to 4.8 using 20% sulfuric acid. This slurry was then added to the high shear mix tank. The temperature and pH were recorded. The brand of PQ Valfor CP 300-63 dry zeolite powder was used.

5. An alumina slurry was prepared by slurring dry alumina powder in water. This slurry can be prepared in the amount of water required to adjust the drier feed slurry to its desired water and solids content. Normally a calculated 22 weight percent (wt. %) solids was employed. This alumina slurry was added to the other catalyst ingredients already in the mix tank under high shear agitation to produce the final spray drier feed slurry. The temperature and pH were recorded. Any suitable alumina powder can be used. The alumina powder used in this comparative example is sold under the trade name Alcoa Alumina Powder CP-2.

6. The spray drier feed was pumped to an Anhydro Model Type III-A No. 4 spray drier employing a spinning wheel atomizer. Operating conditions were, 650° F. (343° C.) inlet temperature, 250° F. (121° C.) outlet temperature, atomizer wheel speed 10,000 rpm.

Table 1 indicates typical results obtained when catalysts were prepared by the prior art procedure. Catalyst hardness as expressed by the CAI index was in excess of 6 weight percent per hour and the attrition in excess of 1.3 weight percent per hour on a rate basis.

TABLE 1

| Run No. | 167 | 185 |
|---|---|---|
| NaY | 2636(25) | 2636(25) |
| Alumina | 526(10) | 526(10) |
| Silica sol | 11500(23) | 11500(23) |
| Clay | 3545(42) | 3545(42) |
| Sol pH | 2.93 | 2.97 |
| Sol Temp./C. | 33 | 31 |
| Feed pH | 3.27 | 3.29 |
| CAI | 9.83 | 9.03 |
| Att./Rate | 1.97 | 1.80 |

Notes
No additives were used in these runs.
Component inputs are shown as weight in grams and the number in ( ) is the percent material on a silica/alumina basis.

The two samples of fluid cracking catalysts produced by this comparative example contained an industry standard concentration of 25 percent sodium Y zeolite as the only active component.

The particle structures of these two samples are comparable to that shown in FIGS. 1A and 1B.

EXAMPLE 1

CATALYST PREPARATIONS EMPLOYING DUPONT TBS SURFACTANT

This example prepared eleven samples of a fluid cracking catalyst from formulas that are standard within the industry except for the addition of a surfactant. All eleven samples had 10 to 25 percent sodium Y zeolite and contained kaolin clay.

The procedure of Comparative Example A was followed except that the desired amount of additive in the form of a 1 gm/100 ml prediluted solution was added to the weighed amount of the desired component slurry.

Tables 2 and 3 present the data obtained using the procedure of the invention wherein the acid stable dispersant was Dupont Zonyl TBS. Catalysts were prepared with a range of zeolite contents from 10 to 25% at 18% binder expressed as silica. The attrition indexes are considerably lower as shown in Table 2, than those of the catalysts of Comparative Example A. All catalysts of the invention had a CAI value of less than 5.00 and an attrition rate of less than 1.00.

TABLE 2

ADDITION OF SURFACTANT TO OTHER CATALYST COMPONENT SLURRIES

| Run No. | 181 | 182 | 183 | 184 |
|---|---|---|---|---|
| Na Y | 2636(25) | 2636(25) | 2636(25) | 2636(25) |
| Alumina | 526(10) | 526(10 | 526(10) | 526(10) |
| Silica sol | 11500(23) | 11500(23) | 11500(23) | 11500(23) |
| Clay | 3636(42) | 3636(42) | 3636(42) | 3636(42) |
| Sol pH | 3.00 | 3.01 | 3.00 | 3.00 |
| Sol Temp. C. | 32 | 31 | 33 | 34 |
| Feed pH | 3.29 | 3.27 | 3.20 | 3.27 |
| CAI | 0.79 | 1.90 | 1.85 | 2.29 |
| Att. Rate | 0.16 | 0.38 | 0.37 | 0.46 |
| Surf./g | 1.00 | 1.00 | 1.00 | 1.00 |
| Add. Point | Silica Sol | Zeolite | Alumina | SD Feed |

Notes
Dupont Zonyl surfactant diluted 1 gram/100 ml of water.
Surfactant was added and mixed into the individual component prior to addition of the component to the high shear mix tank.
Component inputs are shown by weight in grams and the number in ( ) is the percent material on a silica/alumina basis.

TABLE 3

PREPARATION USING 18% BINDER

| Run No. | 150 | 163 | 164 | 165 |
|---|---|---|---|---|
| NaY | 2636(25) | 2136(20) | 1591(15) | 1045(10) |
| Silica sol | 9000(18) | 9000(18) | 9000(18) | 9000(18) |
| Alumina | 526(10) | 526(10) | 526(10) | 526(10) |
| Clay | 3955(47) | 4364(52) | 4818(57) | 5227(62) |
| Sol pH | 2.95 | 2.96 | 3.00 | 2.95 |
| Sol Temp. C. | 36 | 36 | 35 | 36 |
| Feed pH | 3.33 | 3.20 | 3.31 | 3.20 |
| CAI | 4.04 | 1.70 | 2.42 | 1.37 |
| Att. Rate | 0.81 | 0.34 | 0.49 | 0.27 |
| Surf., gm | 1.12 | 1.24 | 1.36 | 1.48 |

Notes
Dupont Zonyl TBS surfactant diluted on the basis of 1 gram/100 ml water and added to the clay slurry.
Surfactant loading is normalized to equal 1 gram per 2442 grams of "as is" clay.
Component inputs are shown by weight in grams and the number in ( ) is the percent material on a silica/alumina basis.

Table 4 demonstrates the effect of varying the Zonyl subsurfactant from 1 to 4 grams per 2442 gm of "as is" clay. The data again indicate substantial improvement over the prior art catalysts of Comparative Example A. No further improvement appears to be observed when the surfactant level is raised to 2 to 4 grams per 2442 grams of "as is" clay.

TABLE 4

PREPARATION USING 23% BINDER

| Run No. | 170 | 171 | 180 |
|---|---|---|---|
| NaY | 2636(25) | 2636(25) | 2636(25) |
| Silica sol | 11500(23) | 11500(23) | 11500(23) |
| Alumina | 526(10) | 526(10) | 526(10) |
| Clay | 3545(42) | 3545(42) | 3545(42) |
| Sol pH | 3.01 | 2.97 | 3.00 |
| Sol Temp. C. | 34 | 33 | 31 |
| Feed pH | 3.26 | 3.31 | 3.23 |

TABLE 4-continued

PREPARATION USING 23% BINDER

| Run No. | 170 | 171 | 180 |
|---|---|---|---|
| CAI | 2.44 | 1.32 | 1.30 |
| Att. Rate | 0.49 | 0.26 | 0.26 |
| Surfactant, gm. | 1.00 | 2.00 | 4.00 |

Notes
Dupont Zonyl TBS surfactant diluted on the basis of 1 gram/100 ml water and added to the clay slurry.
Surfactant loading is normalized to equal 1 gram per 2442 grams of "as is" clay.
Component inputs are shown by weight in grams and the number in ( ) is the percent material on a silica/alumina basis.

The eleven samples of fluid cracking catalysts produced by this example contained an industry standard concentration of 10 to 25 percent sodium Y zeolite as the only active component. The particle structures of these samples are comparable to that shown in FIGS. 2A through 4B.

COMPARATIVE EXAMPLES B AND C AND EXAMPLES 2 THROUGH 4

The catalysts of Comparative Examples B and C were obtained commercially. Their exact formulations and the procedures for preparing them are proprietary.

The catalyst of Comparative Example B is sold under the trade name AMOCO EQ by the AMOCO Corporation. The AMOCO EQ catalyst represents a standard octane catalyst.

The catalyst of Comparative Example C is the AMOCO EQ catalyst with the commercially available octane additive sold under the trade name ZSM-5. The catalyst additive contains 25 percent of the ZSM-5 octane additive in a 90/10 blend of $SiO_2$ to $Al_2O_3$ in air float clay.

The catalysts of the comparative examples were used under standard conditions. The microactivity data of the runs using the catalysts of the comparative examples are presented in Table 5.

TABLE 5

|  | Comp. Ex. B | Comp. Ex. C |
|---|---|---|
| Steam Condition is 1450° F. for 5 hours |  |  |
| C/O | 3.02 | 2.96 |
| WHSV | 15.89 | 16.23 |
| Conv. wt. % | 53.91 | 50.97 |
| Hydrogen wt. % | 0.07 | 0.10 |
| Dry Gas wt. % | 1.69 | 1.57 |
| C1 wt. % | 0.59 | 0.55 |
| C2 wt. % | 0.55 | 0.51 |
| C2 = wt. % | 0.56 | 0.51 |
| Total C3 wt. % | 4.70 | 5.53 |
| C3 wt. % | 1.03 | 0.91 |
| C3 = wt. % | 3.68 | 4.62 |
| Total C4 wt. % | 7.87 | 8.95 |
| IC4 wt. % | 3.09 | 2.96 |
| Total C4 = wt. % | 4.21 | 5.41 |
| NC4 wt. % | 0.58 | 0.58 |
| C4 Olefin Dist. |  |  |
| C4 = 1 wt. % | 0.89 | 1.07 |
| IC4 = wt. % | 1.31 | 1.84 |
| T-C4 = wt. % | 1.17 | 1.46 |
| C-C4 = wt. % | 0.84 | 1.04 |
| C5 + Gaso. wt. % | 34.89 | 33.10 |
| C5 + Gaso./Conv. | 0.65 | 0.65 |
| LCO wt. % | 23.84 | 21.93 |
| G + D wt. % | 58.82 | 55.02 |
| HCO wt. % | 22.25 | 27.11 |
| Coke wt. % | 4.60 | 1.72 |

The catalyst of Examples 2 through 4 are suitable for use a "catalyst additives" in the fluid cracking process and are prepared according to the same general procedures as described for Comparative Example A and Example 1. The catalyst additives of these examples are then blended at a 10 weight percent basis with the AMOCO EQ catalyst of Comparative Example B. The microactivity data of these examples are, therefore, directly comparable to the data of the 90/10 blend of the industry standard octane additive of Comparative Example C.

Example 2 provides a catalyst additive. The catalyst additive contains 15 weight percent clinoptilolite, 10 wt. % ultrastable-Y zeolite, and 0.2 weight percent of the Zonyl TBS surfactant in an air float kaolin clay.

Example 3 provides a catalyst additive. The catalyst additive contains 25 weight percent clinoptilolite and 0.2 weight percent of Zonyl TBS surfactant in an air float kaolin clay.

Example 4 provides a catalyst additive. The catalyst additive contains 25 weight percent of zeolite (30/1 $SiO_2$ to $Al_2O_3S$), 20 weight percent of fuller's earth in kaolin clay, and 0.4 weight percent of Zonyl TBS surfactant.

The catalysts prepared with a 90/10 blend of the AMOCO EQ catalyst to the catalyst additives of the examples were used in a standard fluid cracking process. The microactivity data of these runs are presented in Table 6.

TABLE 6

|  | Ex. 2 | Ex. 3 | Ex. 4 |
|---|---|---|---|
| Steam Condition is 1450° F. for 5 hours |  |  |  |
| C/O | 3.01 | 3.07 | 3.01 |
| WHSV | 15.93 | 15.63 | 15.94 |
| Conv. wt. % | 56.97 | 56.20 | 53.27 |
| Hydrogen wt. % | 0.13 | 0.15 | 0.09 |
| Dry Gas wt. % | 1.93 | 2.19 | 1.87 |
| C1 wt. % | 0.70 | 0.80 | 0.60 |
| C2 wt. % | 0.63 | 0.73 | 0.63 |
| C2 = wt. % | 0.61 | 0.66 | 0.65 |
| Total C3 wt. % | 5.18 | 5.64 | 5.51 |
| C3 wt. % | 0.95 | 1.21 | 0.90 |
| C3 = wt. % | 4.23 | 4.43 | 4.61 |
| Total C4 wt. % | 8.37 | 9.20 | 9.10 |
| IC4 wt. % | 2.66 | 3.15 | 3.04 |
| Total C4 = wt. % | 5.08 | 5.38 | 5.47 |
| NC4 wt. % | 0.63 | 0.67 | 0.59 |
| C4 Olefin Dist. |  |  |  |
| C4 = 1 wt. % | 0.98 | 1.08 | 1.16 |
| IC4 = wt. % | 1.83 | 1.81 | 1.85 |
| T-C4 = wt. % | 1.32 | 1.45 | 1.42 |
| C-C4 = wt. % | 0.95 | 1.04 | 1.04 |
| C5 + Gaso. wt. % | 39.60 | 35.70 | 34.11 |
| C5 + Gaso./Conv. | 0.70 | 0.64 | 0.64 |
| LCO wt. % | 24.93 | 22.29 | 22.40 |
| G + D wt. % | 64.54 | 58.00 | 56.51 |
| HCO wt. % | 18.10 | 21.51 | 24.33 |
| Coke wt. % | 1.75 | 3.31 | 2.58 |

The catalysts of the examples are approximately equal to or better than the industry standard catalyst of Comparative Example C in the total yield of C₄ olefins and have lower coke yields than the standard catalyst of Comparative Example B. The attrition rate of the particles of the examples is significantly below that of the comparative examples.

EXAMPLE 5

This example uses the catalyst of Example 2. The catalyst is added as an additive to the fluid cracking catalyst of Example 1 in a 90/10 blend of catalyst to additive. The resulting catalyst blend has a desirable low attrition rate and a good selectivity for $C_4$ olefins.

EXAMPLE 6

This example uses the catalyst of Example 2 except that the catalyst is prepared with both an acid stable surfactant sold by DuPont under the trade name Zonyl TBS and an alkaline stable surfactant sold by DuPont under the trade name Zonyl FSA. The catalyst is added as an octane additive to the fluid cracking catalyst of Example 1 in a 95/5 blend of catalyst to additive. The resulting catalyst blend has a desirably low attrition rate and a good selectivity for $C_4$ olefins.

EXAMPLE 7

This example uses the catalyst of Example 3 except that the catalyst is prepared with a block copolymer surfactant sold by BASF under the trade name Pluronic. The catalyst is added as an additive to the fluid cracking catalyst of Example 1 in an 80/20 blend of catalyst to additive. The resulting catalyst blend has a desirably low attrition rate.

EXAMPLE 8

This example uses the catalyst of Example 4 except that the catalyst substitutes 10 weight percent of clay with an equivalent weight percent of dachiardite zeolite. The catalyst is added as an additive to the fluid cracking catalyst of Example 1 in a 90/10 blend of catalyst to additive. The resulting catalyst blend has a desirably low attrition rate, and sequesters contaminating metals, increases SOX gettering, and increases gasoline and olefin selectivity.

EXAMPLE 9

This example uses the catalyst of Comparative Example C except that the catalyst is formed into granules. The dried particles of Comparative Example C are placed in a commercial granulator and sprayed with water containing 2 pounds of zonyl TBS surfactant per ton of material. The operation of the granulator produces formed particles of granular size from the material. The granules have a homogenous particle size and a desirably low attrition rate. The granules are desirable for use in an ebulating bed.

COMPARATIVE EXAMPLES D THROUGH G AND EXAMPLES 10 THROUGH 13

These comparative examples and examples compare the microactivity data of catalysts made from clay blends. The catalysts of the comparative examples do not contain a surfactant. The catalysts of the examples are made with the fluorohydrocarbon surfactant sold under the trade name Zonyl TBS.

COMPARATIVE EXAMPLE D AND EXAMPLE 10

The catalysts of Comparative Example D and Example 10 are prepared according to the same general procedures as described for Comparative Example A and Example 1. The catalysts of parative Example D and Example 10 contain 15 weight percent rastable-Y zeolite, 23 weight percent silica sol binder, and weight percent alumina in an air float kaolin clay. The material conditions during the catalytic operation for this comparative example and example are at 950° F. with 3 parts catalyst to 1 part oil feed at 16 weight hourly space velocity ("WHSV"). The catalyst of Example 10 is made with 0.4 weight percent of the fluorohydrocarbon catalyst sold under the trade name Zonyl TBS. The microactivity data of the catalytic operation for Comparative Example D and Example 10 are presented in Table 7.

TABLE 7

|  | Comp. Ex. D | Ex. 10 |
|---|---|---|
| Steam Condition is 1450° F. for 5 hours | | |
| C/O | 2.95 | 3.01 |
| WHSV | 16.26 | 15.95 |
| Conv. wt. % | 46.86 | 52.45 |
| Hydrogen wt. % | 0.07 | 0.08 |
| Dry Gas wt. % | 1.55 | 1.37 |
| C1 wt. % | 0.40 | 0.43 |
| C2 wt. % | 0.52 | 0.44 |
| C2 = wt. % | 0.63 | 0.49 |
| Total C3 wt. % | 3.65 | 4.93 |
| C3 wt. % | 0.69 | 1.17 |
| C3 = wt. % | 2.95 | 3.76 |
| Total C4 wt. % | 6.09 | 8.05 |
| IC4 wt. % | 2.39 | 3.25 |
| Total C4 = wt. % | 3.27 | 4.19 |
| NC4 wt. % | 0.43 | 0.61 |
| C4 Olefin Dist. | | |
| C4 = 1 wt. % | 0.72 | 0.89 |
| IC4 = wt. % | 1.05 | 1.32 |
| T-C4 = wt. % | 0.89 | 1.15 |
| C-C4 = wt. % | 0.62 | 0.84 |
| C5 + Gaso. wt. % | 33.16 | 36.47 |
| C5 + Gaso./Conv. | 0.71 | 0.70 |
| LCO wt. % | 16.07 | 16.99 |
| G + D wt. % | 49.22 | 53.45 |
| HCO wt. % | 37.08 | 30.57 |
| Coke wt. % | 2.34 | 1.55 |

A comparison of the microactivity data of Comparative Example D and Example 10 indicates that the catalyst made according to the invention as represented by Example 10 has improved selectivity. The increased selectivity is demonstrated by the increased weight percent for C5 plus gasoline ("C5+GASO.") and gasoline plus distillates ("G+D").

COMPARATIVE EXAMPLE E AND EXAMPLE 11

The catalysts of Comparative Example E and Example 11 are prepared according to the same general procedures as described for Comparative Example A and Example 1. The catalysts of Comparative Example E and Example 11 contain 15 weight percent ultrastable-Y zeolite, 23 weight percent silica sol binder, and 10 weight percent alumina in a 10/90 blend of fuller's earth and air float kaolin clay. The material conditions during the catalytic operation for this comparative example and example are at 950° F. with 3 parts catalyst to 1 part oil feed at 16 weight hourly space velocity ("WHSV"). The catalyst of Example 11 is made with 0.2 weight percent of the fluorohydrocarbon catalyst sold under the trade name Zonyl TBS. The microactivity data of the catalytic operation for Comparative Example E and Example 11 are presented in Table 8.

TABLE 8

|  | Comp. Ex. E | Ex. 11 |
|---|---|---|
| Steam Condition is 1450° F. for 5 hours | | |
| C/O | 3.02 | 2.97 |
| WHSV | 15.87 | 16.19 |
| Conv. wt. % | 49.81 | 55.11 |
| Hydrogen wt. % | 0.09 | 0.10 |
| Dry Gas wt. % | 1.23 | 1.48 |
| C1 wt. % | 0.40 | 0.42 |
| C2 wt. % | 0.40 | 0.49 |
| C2 = wt. % | 0.44 | 0.58 |
| Total C3 wt. % | 4.09 | 4.66 |
| C3 wt. % | 0.79 | 0.89 |
| C3 = wt. % | 3.30 | 3.77 |
| Total C4 wt. % | 7.08 | 8.48 |
| IC4 wt. % | 2.66 | 3.11 |
| Total C4 = wt. % | 3.97 | 4.80 |
| NC4 wt. % | 0.45 | 0.56 |
| C4 Olefin Dist. | | |
| C4 = 1 wt. % | 0.85 | 1.00 |
| IC4 = wt. % | 1.32 | 1.58 |
| T-C4 = wt. % | 1.05 | 1.30 |
| C-C4 = wt. % | 0.76 | 0.93 |
| C5 + Gaso. wt. % | 35.75 | 37.89 |
| C5 + Gaso./Conv. | 0.72 | 0.69 |
| LCO wt. % | 16.82 | 17.98 |
| G + D wt. % | 52.57 | 55.87 |
| HCO wt. % | 33.37 | 26.91 |
| Coke wt. % | 1.56 | 2.51 |

A comparison of the microactivity data of Comparative Example D and Example 10 indicates that the catalyst made according to the invention as represented by Example 10 has improved selectivity. The increased selectivity is demonstrated by the increased weight percent for C5 plus gasoline ("C5+GASO.") and gasoline plus distillates ("G+D").

COMPARATIVE EXAMPLE F AND EXAMPLE 12

The catalysts of Comparative Example F and Example 12 are prepared according to the same general procedures as described for Comparative Example A and Example 1. The catalysts of Comparative Example F and Example 12 contain 20 weight percent ultrastable-Y zeolite, 23 weight percent silica sol binder, and 10 weight percent alumina in a 10/90 blend of fuller's earth and air float kaolin clay. The material conditions during the catalytic operation for this comparative example and example are at 950° F. with 3 parts catalyst to 1 part oil feed at 16 weight hourly space velocity ("WHSV"). The catalyst of Example 12 is made with 0.2 weight percent of the fluorohydrocarbon catalyst sold under the trade name Zonyl TBS. The microactivity data of the catalytic operation for Comparative Example F and Example 12 are presented in Table 9.

TABLE 9

|  | Comp. Ex. F | Ex. 12 |
|---|---|---|
| Steam Condition is 1450° F. for 5 hours | | |
| C/O | 3.00 | 3.03 |
| WHSV | 16.01 | 15.86 |
| Conv. wt. % | 54.54 | 63.99 |
| Hydrogen wt. % | 0.09 | 0.10 |
| Dry Gas wt. % | 1.46 | 1.64 |
| C1 wt. % | 0.47 | 0.46 |
| C2 wt. % | 0.45 | 0.52 |
| C2 = wt. % | 0.54 | 0.67 |
| Total C3 wt. % | 5.05 | 4.99 |
| C3 wt. % | 0.93 | 0.97 |
| C3 = wt. % | 4.13 | 4.03 |
| Total C4 wt. % | 9.38 | 9.26 |
| IC4 wt. % | 3.89 | 3.93 |
| Total C4 = wt. % | 4.78 | 4.63 |
| NC4 wt. % | 0.70 | 0.69 |
| C4 Olefin Dist. | | |
| C4 = 1 wt. % | 1.03 | 1.02 |
| IC4 = wt. % | 1.44 | 1.36 |
| T-C4 = wt. % | 1.34 | 1.31 |
| C-C4 = wt. % | 0.98 | 0.95 |
| C5 + Gaso. wt. % | 36.97 | 45.48 |
| C5 + Gaso./Conv. | 0.68 | 0.71 |
| LCO wt. % | 16.57 | 18.70 |
| G + D wt. % | 53.47 | 64.18 |
| HCO wt. % | 28.90 | 17.31 |
| Coke wt. % | 1.66 | 2.52 |

A comparison of the microactivity data of Comparative Example F and Example 12 indicates that the catalyst made according to the invention as represented by Example 12 has improved selectivity. The increased selectivity is demonstrated by the increased weight percent for C5 plus gasoline ("C5+GASO.") and gasoline plus distillates ("G+D").

COMPARATIVE EXAMPLE G AND EXAMPLE 13

The catalysts of Comparative Example G and Example 13 are prepared according to the same general procedures as described for Comparative Example A and Example 1. The catalysts of Comparative Example G and Example 13 contain 35 weight percent ultrastable-Y zeolite, 23 weight percent silica sol binder, and 10 weight percent alumina in a 10/90 blend of fuller's earth and air float kaolin clay. The material conditions during the catalytic operation for this comparative example and example are at 950° F. with 3 parts catalyst to 1 part oil feed at 16 weight hourly space velocity ("WHSV"). The catalyst of Example 13 is made with 0.2 weight percent of the fluorohydrocarbon catalyst sold under the trade name Zonyl TBS. The microactivity data of the catalytic operation for Comparative Example G and Example 13 are presented in Table 10.

TABLE 10

|  | Comp. Ex. G | Ex. 13 |
|---|---|---|
| Steam Condition is 1450° F. for 5 hours | | |
| C/O | 3.06 | 3.06 |
| WHSV | 15.68 | 15.69 |
| Conv. wt. % | 67.99 | 73.49 |
| Hydrogen wt. % | 0.07 | 0.08 |
| Dry Gas wt. % | 1.94 | 2.12 |
| C1 wt. % | 0.61 | 0.67 |
| C2 wt. % | 0.55 | 0.59 |
| C2 = wt. % | 0.78 | 0.86 |
| Total C3 wt. % | 6.57 | 6.96 |
| C3 wt. % | 1.90 | 2.10 |
| C3 = wt. % | 4.67 | 4.86 |
| Total C4 wt. % | 12.49 | 13.27 |
| IC4 wt. % | 6.33 | 6.90 |

TABLE 10-continued

|  | Comp. Ex. G | Ex. 13 |
| --- | --- | --- |
| Total C4 = wt. % | 4.78 | 4.83 |
| NC4 wt. % | 1.38 | 1.54 |
| C4 Olefin Dist. |  |  |
| C4 = 1 wt. % | 1.05 | 1.11 |
| IC4 = wt. % | 1.28 | 1.19 |
| T-C4 = wt. % | 1.41 | 1.45 |
| C-C4 = wt. % | 1.05 | 1.08 |
| C5 + Gaso. wt. % | 43.91 | 48.02 |
| C5 + Gaso./Conv. | 0.65 | 0.65 |
| LCO wt. % | 16.70 | 17.03 |
| G + D wt. % | 60.60 | 65.05 |
| HCO wt. % | 15.31 | 9.48 |
| Coke wt. % | 3.01 | 3.03 |

A comparison of the microactivity data of Comparative Example G and Example 13 indicates that the catalyst made according to the invention as represented by Example 13 has improved selectivity. The increased selectivity is demonstrated by the increased weight percent for C5 plus gasoline ("C5+GASO.") and gasoline plus distillates ("G+D").

We claim:

1. A process for improving the physical and catalytic properties of a sol-based fluid cracking catalyst which comprises the steps of:

(a) preparing an acid aluminum sulfate silica sol binder component;

(b) preparing a first clay slurry component;

(c) combining said components of steps (a) and (b);

(d) preparing a second clay slurry component that is an active mineral component;

(e) preparing an alumina slurry component;

(f) adding an effective amount of an alkaline stable surfactant or an acid stable surfactant to at least one of said components of steps (a) through (e);

(g) combining and spray drying all of said components; and (h) washing, exchanging, and drying particles of said sol-based fluid cracking catalyst.

2. The process of claim 1 wherein said second clay slurry component is a zeolite.

3. The process of claim 1 wherein said components are combined, and after said combination, an alkaline stable surfactant or an acid stable surfactant is added to a spray drier feed and spray dried.

4. The process of claim 1 wherein said first clay slurry component is prepared by adding a sufficient quantity of kaolin clay to water to prepare a slurry containing about 70 percent solids.

* * * * *